US012650977B2

(12) United States Patent
Gowd et al.

(10) Patent No.: US 12,650,977 B2
(45) Date of Patent: Jun. 9, 2026

(54) PROACTIVE ANOMALY DETECTION

(71) Applicant: SAP SE, Walldorf (DE)

(72) Inventors: Arun Kumar Gowd, Bangalore (IN); Pankaj Kumar, Bangalore (IN); Yasra Shakil, Bangalore (IN); Bibhas Mandal, Bangalore (IN); Runa Nath, Kolkata (IN); Edwin M. Jose, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/924,632

(22) Filed: Oct. 23, 2024

(65) Prior Publication Data

US 2026/0111417 A1     Apr. 23, 2026

(51) Int. Cl.
*G06F 16/23* (2019.01)

(52) U.S. Cl.
CPC ...... *G06F 16/2379* (2019.01); *G06F 16/2365* (2019.01)

(58) Field of Classification Search
CPC ............. G06F 16/2379; G06F 16/2365; G06F 21/552; G06F 21/00; G06F 21/50; G06F 11/0751; G06F 11/0781; G06F 11/0787; G06F 11/0793; G06F 11/1048; G06F 11/1433; G06F 16/215; G06F 21/554; G06F 3/0653; H04L 63/1425
USPC ...................................... 726/23, 25; 707/687
See application file for complete search history.

(56) References Cited

U.S. PATENT DOCUMENTS

| | | | | |
|---|---|---|---|---|
| 6,052,525 A | * | 4/2000 | Carlson | G06F 9/454 |
| | | | | 714/38.12 |
| 2006/0229931 A1 | * | 10/2006 | Fligler | G06Q 30/02 |
| | | | | 705/7.38 |

| | | | | |
|---|---|---|---|---|
| 2012/0137367 A1 | * | 5/2012 | Dupont | G06F 21/00 |
| | | | | 726/25 |
| 2014/0096249 A1 | * | 4/2014 | Dupont | G06F 21/00 |
| | | | | 726/23 |
| 2014/0188829 A1 | * | 7/2014 | Ranganathan | G06F 16/21 |
| | | | | 707/705 |

(Continued)

FOREIGN PATENT DOCUMENTS

| | | | | |
|---|---|---|---|---|
| CN | 112433879 A | * | 3/2021 | G06F 11/1048 |

OTHER PUBLICATIONS

Sakpal, Manasi "How to Improve Your Data Quality", Insights, Jul. 14, 2021, 10pgs.

(Continued)

*Primary Examiner* — Dennis Truong
(74) *Attorney, Agent, or Firm* — Buckley, Maschoff & Talwalkar LLC

(57)     ABSTRACT

Systems and methods include creation of data associated with an instance of an entity, requesting, in response to creating the data, of execution of a partial anomaly check of stored data associated with the instance of the entity, detection of a log entry associated with the partial anomaly check, identification, based on the log entry, of the instance of the entity, determination that the instance of the entity is a critical instance, determination, in response to determining that the instance of the entity is a critical instance, to perform a full anomaly check based on the instance of the entity, and requesting, in response to determining to perform the full anomaly check, of execution of a full anomaly check of stored data associated with the instance of the entity.

17 Claims, 16 Drawing Sheets

(56)  References Cited

U.S. PATENT DOCUMENTS

| | | | |
|---|---|---|---|
| 2018/0367371 A1* | 12/2018 | Nagarajan | H04L 41/0866 |
| 2023/0153430 A1* | 5/2023 | Jin | G06F 21/56 |
| | | | 726/23 |
| 2024/0281419 A1* | 8/2024 | Alfaras | G06F 16/215 |

OTHER PUBLICATIONS

Khelladi, Djamel Eddine et al., "Detecting and Exploring Side Effects when Repairing Model Inconsistencies" SLE 2019-12th ACM SIGPLAN International Conference on Software Language Engineering, Oct. 20-22, 2019 Athens, Greece, 15pgs.

Gowd, Arun Kumar et al., "Exploring Anomalies in Master data: Insights, Impacts, Proactive identification, and Solution strategy", 2023, 11pgs.

Fan, Liju et al., "Measuring Inconsistency in Bank Holding Company Data", DSMM '19, Jun. 20, 2019, Amsterdam, Netherlands, ACM ISBN 978-1-4503-6823-0/19/06, https://doi.org/10.1145/3336499.3338007, 6pages.

"Sap S/4HANA Cookbook: Customer/Vendor Integration", Feb. 2022, (1-104, 104 total pages).

SAP Press "Understanding the SAP S/4HANA Business Partner Structure", 2024, 12pgs.

Mane, Sushant et al., "Verify, And Then Trust: Data Inconsistency Detection in ZooKeeper", ISBN 979-8-4007-0086-6/23-05, https://doi.org/101145/3578358.3591328 (pp. 16-22, 7 total pages).

* cited by examiner

500

S510

Retrieve Log Entry From Anomaly Log

S520

Determine Entity Instance Associated With Log Entry

S530

Is Entity Instance Critical?

No

Yes

S540

Initiate Full Anomaly Check On Data Associated With Entity Instance

1000

1200

1300

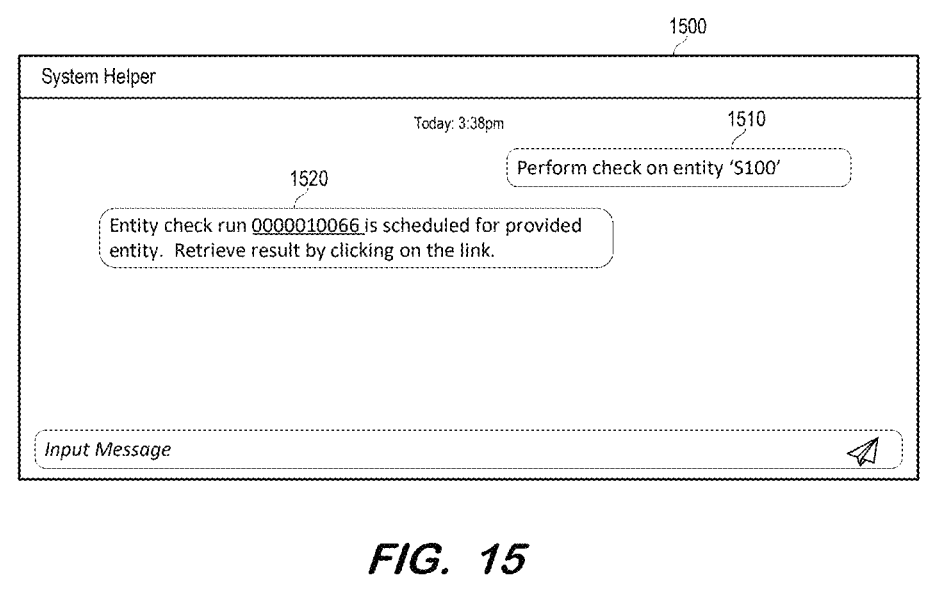

1500

System Helper

Today: 3:38pm

1510

Perform check on entity 'S100'

1520

Entity check run 0000010066 is scheduled for provided entity. Retrieve result by clicking on the link.

*Input Message*

FIG. 15

PROACTIVE ANOMALY DETECTION

BACKGROUND

Modern organizations utilize vast amounts of data. The data may include transactional data generated during the course of organizational activities. Master data, on the other hand, describes attributes of entities which are regularly and logically linked to the activities of the organization. These entities may consist of materials, products, individuals, and organizations, for example. Master data is a critical organizational asset, the quality of which is directly related to the precision of upstream processes and applications.

Unfortunately, the quality of master data is often compromised by anomalies therein. Anomalies may result, for example, from manual data entry errors, mass processing, absence of validation rules, system glitches, fraudulent activities, and multiple entry points. If an anomaly is identified within master data, it is often as a result of a failure of a transaction which is based on the master data. At this point, the damage caused by the anomaly (e.g., supply chain disruptions, inaccurate forecasting, customer dissatisfaction, financial losses) has already occurred.

To address the foregoing, conventional systems conduct master data anomaly checks on regular basis in a background job. Due to the volume of master data in a typical organization, these checks are time- and resource-consuming. Moreover, since these checks are applied indiscriminately, they can be inefficient, and their benefits might be outweighed by the resources consumed.

Systems are desired to efficiently provide proactive anomaly detection within a computing system landscape.

BRIEF DESCRIPTION OF THE DRAWINGS

FIG. 15 is a user interface of a generative AI chatbot according to some embodiments.

DETAILED DESCRIPTION

Figure 1:
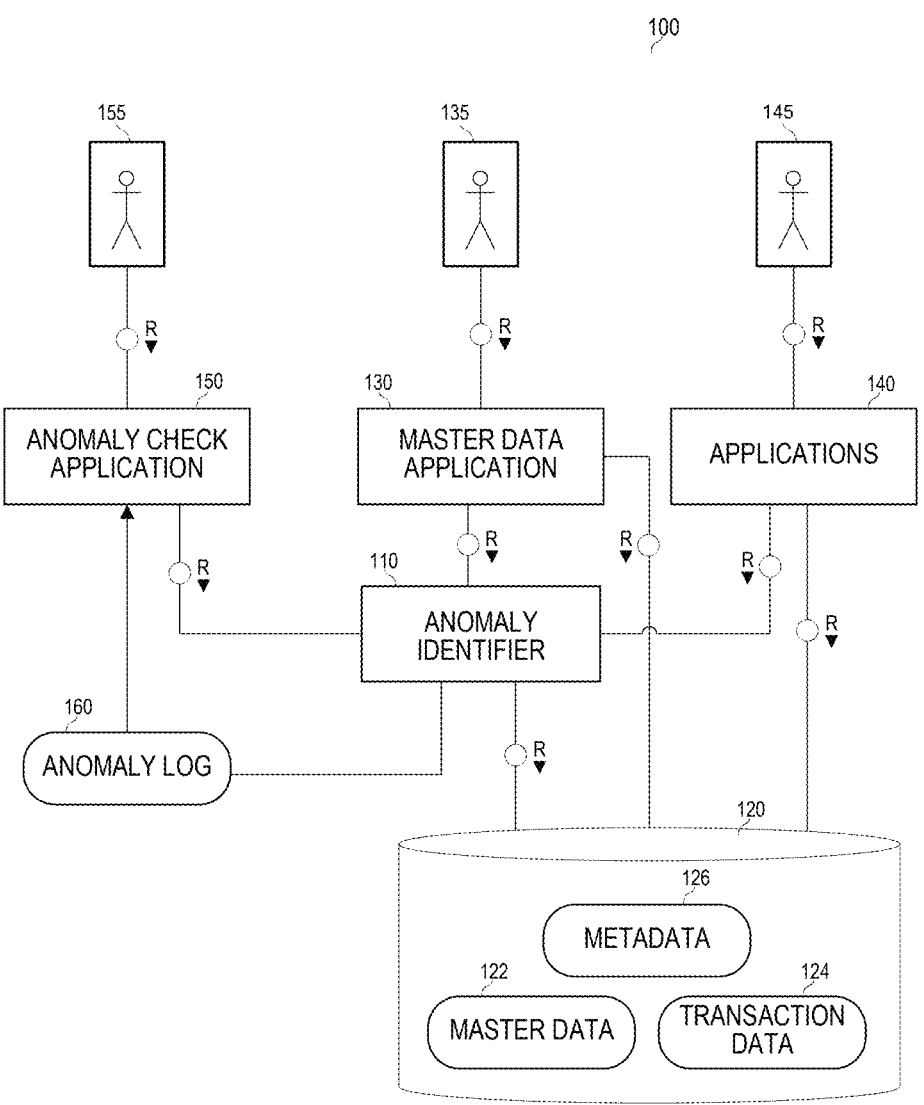
FIG. 1 illustrates a system to provide proactive anomaly detection according to some embodiments.

The following description is provided to enable any person in the art to make and use the described embodiments. Various modifications, however, will remain readily-apparent to those in the art.

Some embodiments provide proactive and efficient anomaly detection. Anomalies may comprise attribute values that deviate significantly from the norm. Types of anomalies include, but are not limited to, point anomalies, contextual anomalies, spatial anomalies and collective anomalies.

A point anomaly is a single attribute value that deviates significantly from its expected pattern. An example of a point anomaly is an international telephone number for a domestically-located entity. A contextual anomaly deviates from an expected pattern in a specific context. For example, a spike in order volumes might be considered non-anomalous during a holiday season but considered an anomaly during a non-peak period.

Spatial anomalies involve outliers within spatial data. For example, each organizations of a given region may exhibit an anomalistic pattern or behavior as compared to organizations of other regions. Collective anomalies are sets of data points that collectively deviate from an overall data set, even though the individual data points of the sets may not be anomalous with respect to one another. A group of organizations from the same region which show similar, but unusual purchasing behavior may represent a collective anomaly.

In other examples, an anomaly exists when a record is stored in multiple places and all the copies of the record are not identical. Anomalies also occur when data is stored with more or less redundancy than desired. Additionally, an anomaly exists if a customer record is deleted but records of invoices for that customer are not deleted.

Some embodiments provide selective and proactive anomaly detection. For example, some embodiments provide a component which may be instructed to perform one or more types of anomaly checks on specific master data and to log the detected anomalies. The component exposes an application programming interface (API) which may be called by an external application or by a co-located process.

According to some embodiments, a master data management application may call the component to request one or more types of anomaly checks upon creation or modification of a master data record. An administrator may operate the master data management application to request an anomaly check for specific "critical" master data. In another example, a transactional application may call the component to request one or more types of anomaly checks when a specific type of master data entity (e.g., a Partner) is used for any application-specific purposes such as, for example, creation of a sales order.

In a case that an application triggers an anomaly check, the anomaly check may terminate upon detection of a first anomaly. The anomaly may be logged and the log may be used to trigger future anomaly checks. For example, a separate application may periodically review the log, identify logged anomalies, and request execution of full anomaly checks for master data entities associated with the logged anomalies. Alternatively, the separate application may identify logged anomalies associated with pre-defined "critical"

entities, and only request execution of anomaly checks for the critical entities. These approaches may efficiently avoid checking lesser-used and/or less important master data entities for anomalies.

FIG. 1 illustrates system 100 according to some embodiments. The illustrated components of system 100 may be implemented using any suitable combinations of computing hardware and/or software that are or become known. Such combinations may include cloud-based implementations in which computing resources are virtualized and allocated elastically. In some embodiments, two or more components are implemented by a single computing device. System 100 may comprise disparate cloud-based services, a single physical or virtual server, a cluster of physical or virtual servers, several clusters of physical or virtual servers, and any other combination that is or becomes known.

Anomaly identifier 110 may comprise program code which is executable to expose an API. The API is callable to initiate performance of anomaly checks on master data entities. The anomaly checks may comprise any types of anomaly checks that are or become known, including but not limited to data model inconsistency checks, data accuracy checks, validation checks, and master data comparison checks. Anomaly identifier 110 may execute on an on-premise or cloud-based server (not shown) providing an execution platform and services to applications such as anomaly identifier 110.

Data store 120 stores master data 122, transaction data 124 and metadata 126 according to some embodiments. Data store 120 may comprise any one or more storage systems that are or become known. Data store 120 may comprise distributed and/or redundant storage which is on-premise and/or cloud-based.

Master data 122 may comprise data records such as database table rows. Each data record of master data 122 may represent an instance of a master data entity, such as a specific material, a specific product, a specific individual, and a specific organization. Similarly, transaction data 124 may comprise data records representing instances of a transaction entities, for example, specific sales orders, invoices, purchase orders, etc. Metadata 126 may define the master data entities and the transaction entities. For instance, master data 122 and transaction data 124 may comprise relational database tables whose columns conform to a data schema defined by metadata 126.

The entities defined by metadata 126 may comprise any logical entity types. In one example, metadata 126 defines a Partner master data entity. The Partner master data entity may, in some examples, specify three categories to which a Partner master data entity instance may belong, a Person, a Group, and an Organization. Each different category may be associated with a different set of fields, a different set of roles, and different relationship categories.

The data of a Partner master data entity instance may be stored in different tables of master data 122. For example, master data 122 may include a table for storing Partner addresses, a table for storing Partner roles, a table for storing Partner banking information, etc.

Master data application 130 may create and edit master data instances of master data 122. Master data application 130 may comprise program code executed by a server which is accessed by a client device (not shown) operated by master data administrator 135. The client device may execute a front-end application corresponding to application 130 to present user interfaces thereof. Master data application 130 may also call (via an API or REST API, for example) anomaly identifier 110 to initiate desired anomaly checks of master data 122 of data store 120.

Applications 140 may comprise any software applications which may use master data 122 and transaction data 120. For example, applications 140 may include a Human Resource Management application, a Customer Relationship Management application, a Supply Chain Management application, etc. Applications 140 may be operated by a user 145 to create, read, update and delete records of transaction data 124. These records of transaction data 124 may include identifiers (i.e., foreign keys) of records of master data 122 to associate the records of transaction data 124 with corresponding master data entity instances.

Anomaly check application 150 may be operated by administrator 155 to selectively initiate anomaly checks via anomaly identifier 110. Anomaly check application 150 may execute on a platform different from the platform of anomaly identifier 110 and may therefore call anomaly identifier 110 via OData REST APIs for example.

System 100 supports several usage scenarios. Master data application 130 may call anomaly identifier 110 to initiate an anomaly check upon creation or update of a master data entity instance. Applications 140 may call anomaly identifier 110 to initiate an anomaly check when a master data entity instance is used for any application-specific purposes such as, for example, being referenced in a newly-created sales order or a purchase order. Anomaly check application 150 may call anomaly identifier 110 to initiate an anomaly check at any suitable time and on any one or more master data entity instances (e.g., in-use or critical master data entity instances). The foregoing usage scenarios may be more efficient than simply running anomaly checks on regular basis in a background job for all master data entity instances.

Anomaly identifier 110 logs any detected anomalies in anomaly log 160. According to some embodiments, anomaly check application 150 reviews anomaly log and calls anomaly identifier 110 to initiate anomaly checks based on the contents of anomaly log 160. For example, anomaly identifier 110 may conduct anomaly checks based on calls received from application 130 and/or application 140. Each anomaly check is conducted until an anomaly is detected, at which time anomaly identifier 110 terminates the anomaly check and stores an entry including information associated with the detected anomaly (e.g., the master data entity instance, the anomaly type) in anomaly log 160.

Meanwhile, anomaly check application 150 monitors anomaly log 160 and determines anomaly checks to initiate based on the entries of anomaly log 160. In one example, anomaly check application 150 calls anomaly identifier 110 to initiate anomaly checks of all master data entity instances specified in the entries of anomaly log 160. The calls may occur during periods of low or low-cost usage of system 100. To further conserve resources, anomaly check application 150 may identify pre-determined critical master data entity instances specified in the entries of anomaly log 160 and call anomaly identifier 110 to initiate anomaly checks for only those master data entity instances. Accordingly, some embodiments use anomaly checks triggered by application 130 and applications 140 to identify candidate master data entity instances (i.e., instances associated with at least one anomaly) and use anomaly check application 150 to selectively initiate timely anomaly checks on all or some of the candidate master data entity instances.

Figure 2:
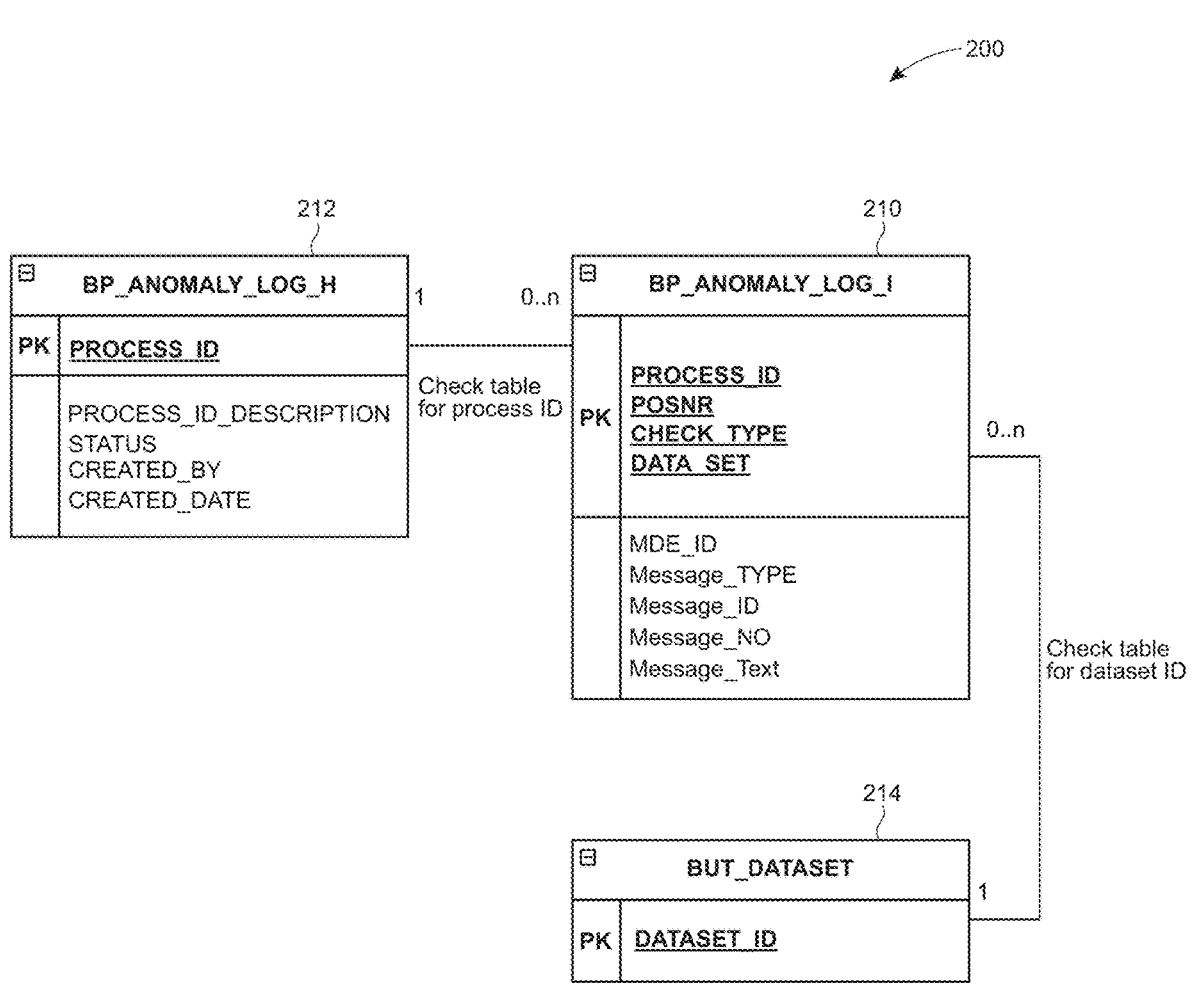
FIG. 2 is a modelling diagram of entities of an anomaly log according to some embodiments.

FIG. 2 is a modelling diagram of entities 200 of an anomaly log according to some embodiments. When an anomaly detection process is initiated, a plain language process description is provided. This initiates creation of an entry in header table 212 having an internally-generated process ID and a status of "In progress". A user ID (CRE-ATED_BY) of the user who initiated the process and the creation date of the process are also recorded.

Individual anomaly checks are then triggered based on the requested check type(s) and dataset. The user can also specify the dataset ID(s) of datasets for which the check is to be conducted. Dataset table 214 includes a list of per-missible dataset IDs that can be evaluated across the check types.

Item table 210 records error messages generated during the anomaly detection process along with the master data entity ID (MDE_ID) for which the message is generated. A particular log entry may record zero, one or many anomaly-related messages. Upon successful completion of the anomaly check, the status in header table 212 is updated to "Success".

Figure 3:
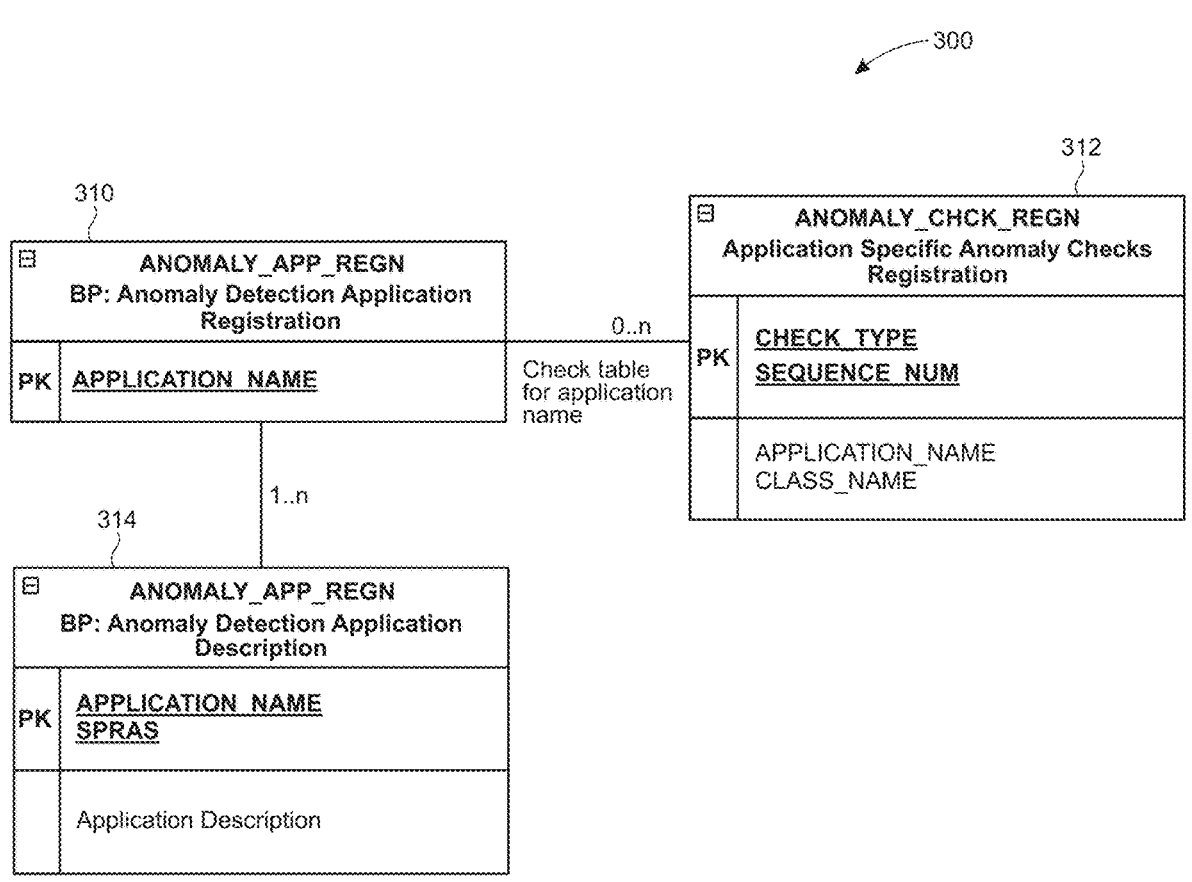
FIG. 3 is a modelling diagram of entities of an anomaly check registration interface according to some embodiments.

FIG. 3 is a modelling diagram of entities 300 of an anomaly check registration interface according to some embodiments. The interface allows applications to add anomaly checks to the check types offered by anomaly identifier 110. Entities 310 and 314 store the application names and descriptions, and entity 312 stores the specific check type with which the added anomaly check is associ-ated. The sequence number of entity 312 defines the priority in which the added check is to be executed within a particular check type.

Figure 4:
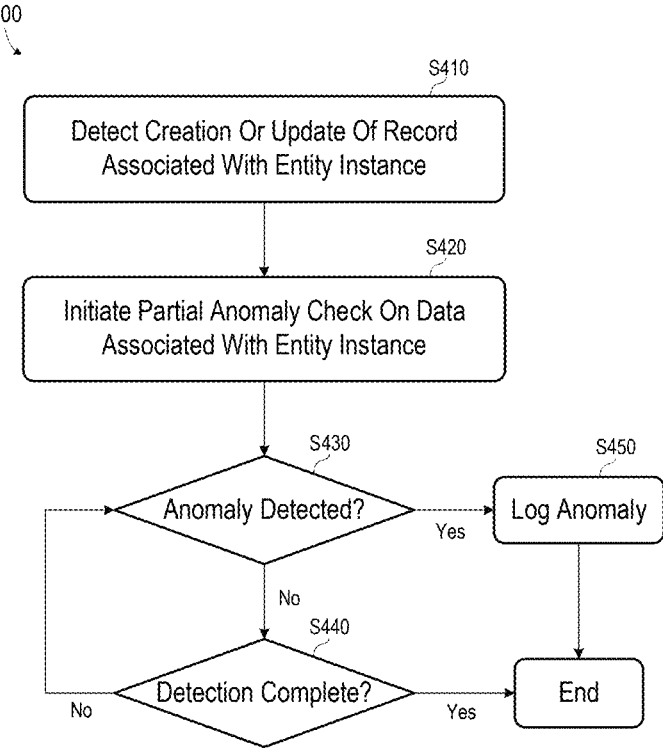
FIG. 4 is a flow diagram of a process to perform an anomaly check according to some embodiments.

FIG. 4 comprises a flow diagram of process 400 to perform an anomaly check according to some embodiments. Process 400 and the other processes described herein may be performed using any suitable combination of hardware and software. Software program code embodying these pro-cesses may be stored by any non-transitory tangible medium, including a fixed disk, a volatile or non-volatile random-access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

At S410, creation or update of a record associated with an entity instance is detected. For example, administrator 135 may instruct application 130 to update address data associ-ated with a Partner entity instance such as an existing organization. In another example of S410, user 145 may instruct an application 140 to create a new sales order in which the existing organization is specified as a supplier within the sales order. Embodiments are not limited to these examples.

In response to the detection at S410, a partial anomaly check on data associated with the instance is initiated at S420. S420 may comprise calling anomaly identifier 110, for example using an interface defined by entities 200 of FIG. 2. The call specifies the entity instance and also specifies one or more anomaly checks to perform on the data associated with the entity instance. Anomaly identifier 110 then begins executing the specified anomaly checks.

The anomaly check initiated at S420 is referred to as a partial anomaly check because the check is intended to terminate once a single anomaly is detected. A partial anomaly check may include a check for any anomalies on any datasets using any anomaly detection algorithm.

At S430, it is determined whether an anomaly has been detected by the initiated anomaly checks. If not, flow proceeds to S440 to determine whether the anomaly checks have been completed. If not, flow returns to S430. Flow therefore cycles between S430 and S440 until it is deter-mined that an anomaly has been detected or it is determined at S440 that the anomaly checks are complete.

Flow proceeds to S450 if it is determined at S430 that an anomaly has been detected. At S450, a log entry associated with the anomaly is created and stored in an anomaly log. The log entry may specify the anomaly check which detected the anomaly, an error message, and an identifier of the entity instance. Process 400 then terminates. Process 400 also terminates, without logging an anomaly, if it is deter-mined at S440 that the anomaly checks are complete. A log entry may also be created if no anomalies are detected, as described above.

Figure 5:
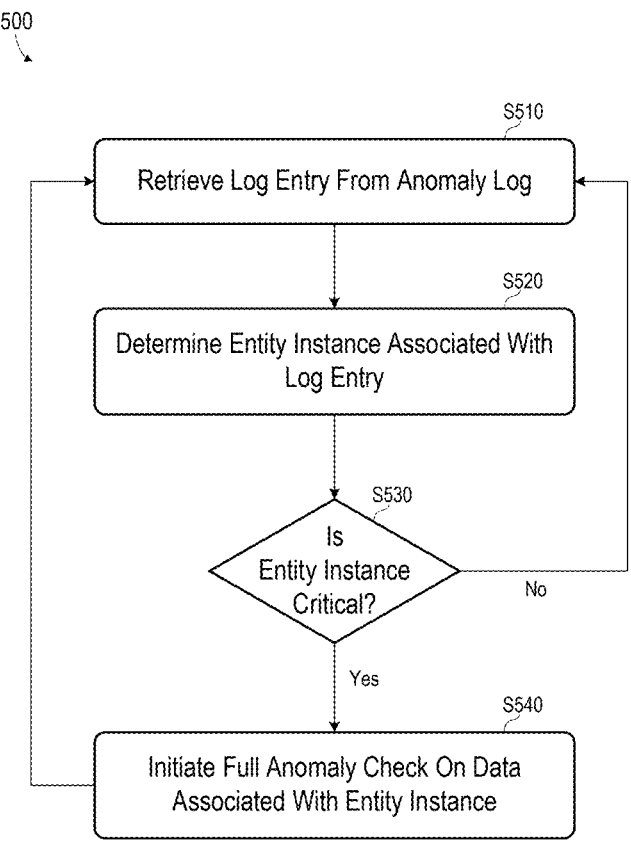
FIG. 5 is a flow diagram of a process to perform an anomaly check according to some embodiments.

Process 500 of FIG. 5 may be performed to trigger anomaly checks based on log entries of an anomaly log according to some embodiments. A log entry is retrieved from an anomaly log at S510. S510 may be performed according to a schedule in order to retrieve log entries, in response to storage of log entries in the anomaly log, or in any other manner. The retrieved log entry may conform to the schema of entities 200 in some embodiments.

An entity instance associated with the log entry is deter-mined at S520. The entity instance is an instance whose associated data was found to include an anomaly. Next, at S530, it is determined whether the entity instance is critical. In some embodiments, process 500 is executed by anomaly application 150 and anomaly application 150 accesses a data store which specifies entity instances designated as critical. In other embodiments, the retrieved log entry indicates whether the entity instance is critical, i.e., important.

A client application which calls an anomaly identifier to perform anomaly checks may specify that the entity instance for which checks are to be performed is critical. Accord-ingly, any log entry created in response to the anomaly checks may indicate that the entity instance is critical. Creation of a log entry may alternatively include checking stored master data which specifies whether a master data entity instance is critical. An administrator (e.g., 135) may specify the criticality of a master data entity instance upon creation or update of corresponding master data using a master data application (e.g., 130) as described above, causing a flag indicating such criticality to be stored in association with the master data entity instance data.

Flow returns to S510 from S530 if the entity instance is not critical. If the entity instance is determined to be critical, flow proceeds to S540 to initiate a full anomaly check of the entity instance. Initiation of the full anomaly check may include calling an API of an anomaly identifier and speci-fying the entity instance and one or more anomaly checks to perform on data associated with the entity instance. In contrast to a partial anomaly check as described herein, a full anomaly check does not terminate once a first anomaly is detected but continues until all specified anomaly checks are run on the data. In response, the anomaly identifier performs the specified anomaly checks and may generate log entries indicating the results of the anomaly checks. The results may include zero, one or more anomalies detected by each anomaly check.

Figure 6:
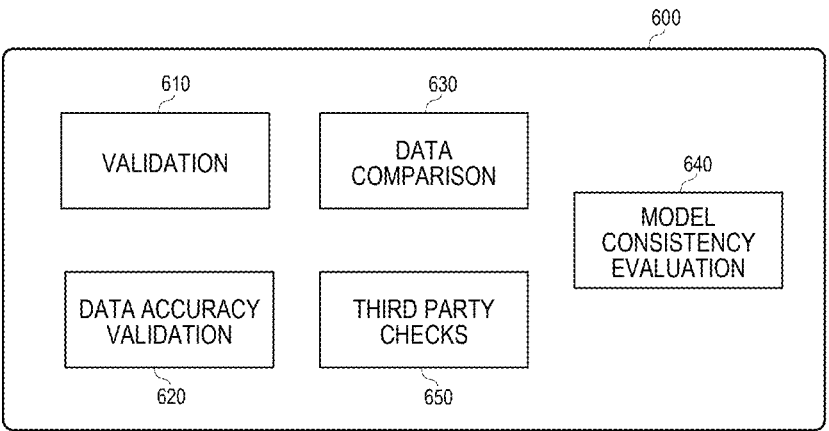
FIG. 6 is a block diagram of an anomaly detection component according to some embodiments.

FIG. 6 is a block diagram of anomaly detection compo-nent 600 according to some embodiments. Anomaly detec-tion component 600 may comprise an implementation of anomaly identifier 110 of system 100. As shown, anomaly detection component 600 includes program code of valida-tion component 610, data accuracy validation component 620, data comparison component 630, model consistency evaluation component 640, and third-party checks 650. Checks 650 may comprise program code of third-party anomaly checks which are registered with component 600 using the interface of FIG. 3. Embodiments are not limited to the components or to the anomaly checks of anomaly detection component 600.

Figure 7:
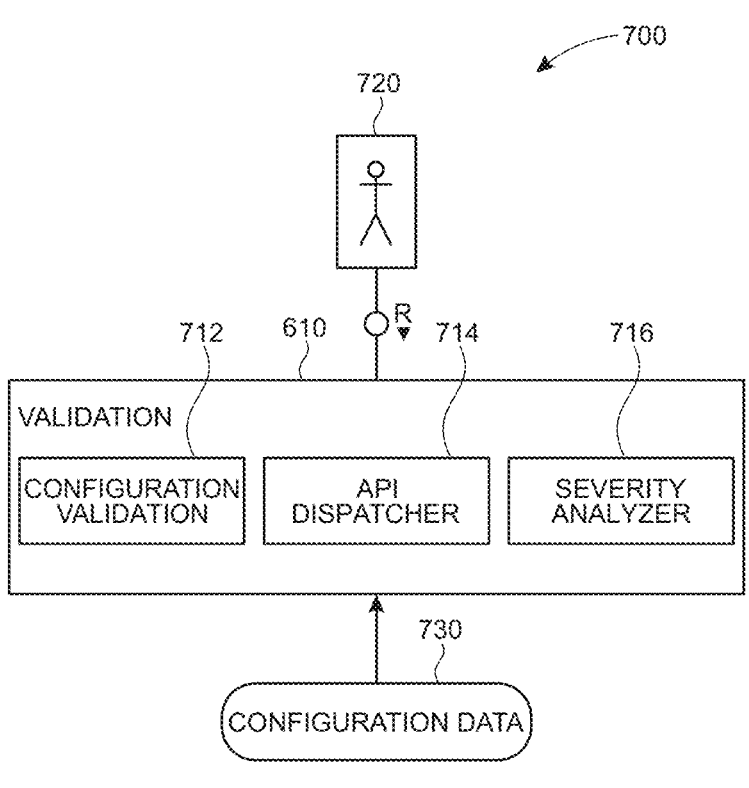
FIG. 7 is a block diagram of a validation component according to some embodiments.

FIG. 7 is a block diagram of validation component 610 according to some embodiments. Validation component 610 conducts anomaly checks based on validations across various datasets of a master data entity (e.g., Bank, Address, Payment Card, Identification datasets of a Partner entity). Configuration validation component 712 determines the existing system configuration from configuration data 730 and validates the entity instance data against the configuration. API dispatcher 714 calls dataset-specific APIs to perform the validations, while severity analyze 716 assigns severities to the anomalies identified by the APIs, consolidates results and returns the results back to the anomaly check API exposed by component 600.

Generally, validation involves confirming that data is accurate, complete, consistent, and relevant. Validation criteria may require checking data format, verifying the relationship between different data entities, etc. Validation may include data profiling, data cleansing, data verification and/or data enrichment.

In data profiling, various statistical techniques and algorithms are applied to identify missing values, duplicates, outliers, and inconsistencies. Data cleansing is the process of identifying and correcting (or removing) corrupt, inaccurate, or irrelevant data. Data cleansing may include removing duplicate records, correcting misspellings, standardizing formats, and resolving inconsistencies. Data verification refers to the process of cross-checking the data against a reliable source or using algorithms to confirm its accuracy. Data enrichment involves enhancing data with additional information from external sources to add missing or relevant attributes.

Figure 8:
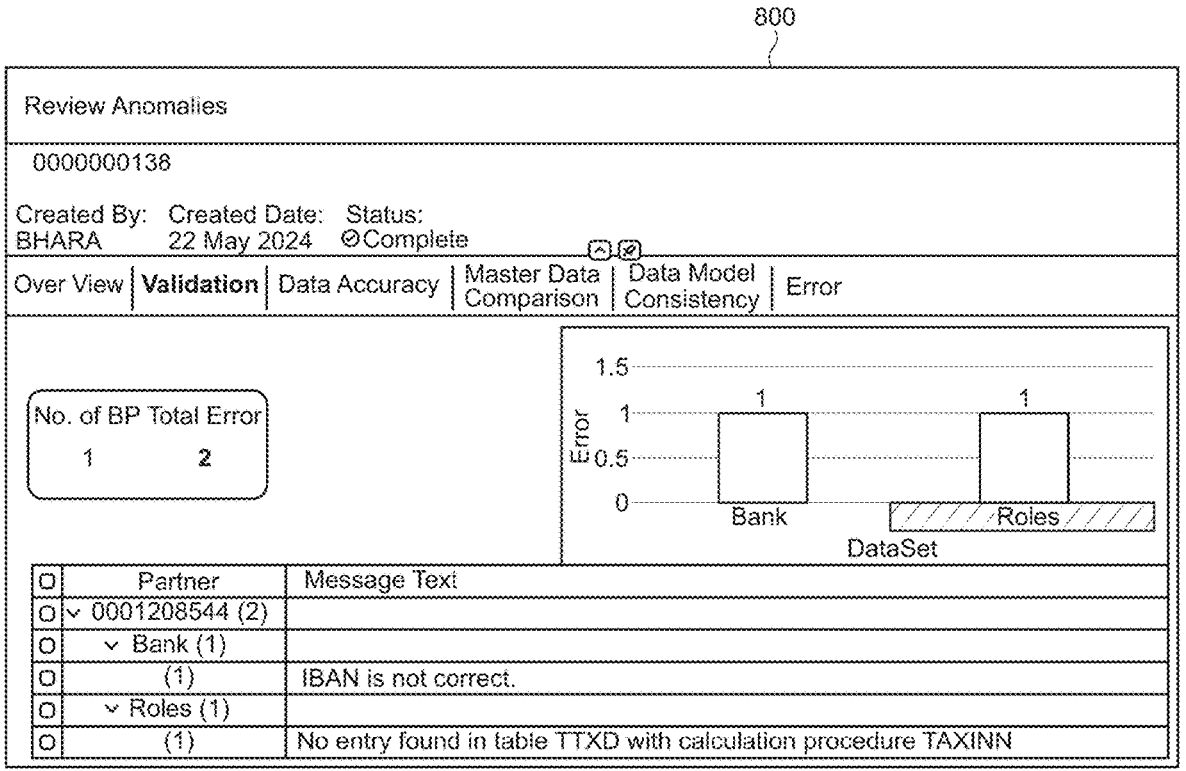
FIG. 8 is a user interface for presenting validation anomalies according to some embodiments.

FIG. 8 is a user interface for presenting validation anomalies detected by a configuration validation component according to some embodiments. Interface 800 may be presented by a client application in communication with an application such as anomaly check application 150. For example, anomaly check application 150 may receive results of one or more anomaly checks from anomaly log 160 or from anomaly identifier 110, create a visualization representing the results, and transmit the visualization to a user via a user interface (e.g., a Web browser).

As shown, interface 800 illustrates a number of anomalies (i.e., errors) detected for a particular Partner entity, and the datasets in which the anomalies were detected. Interface 800 also includes message text describing the detected anomalies. Embodiments are not limited to interface 800.

Figure 9:
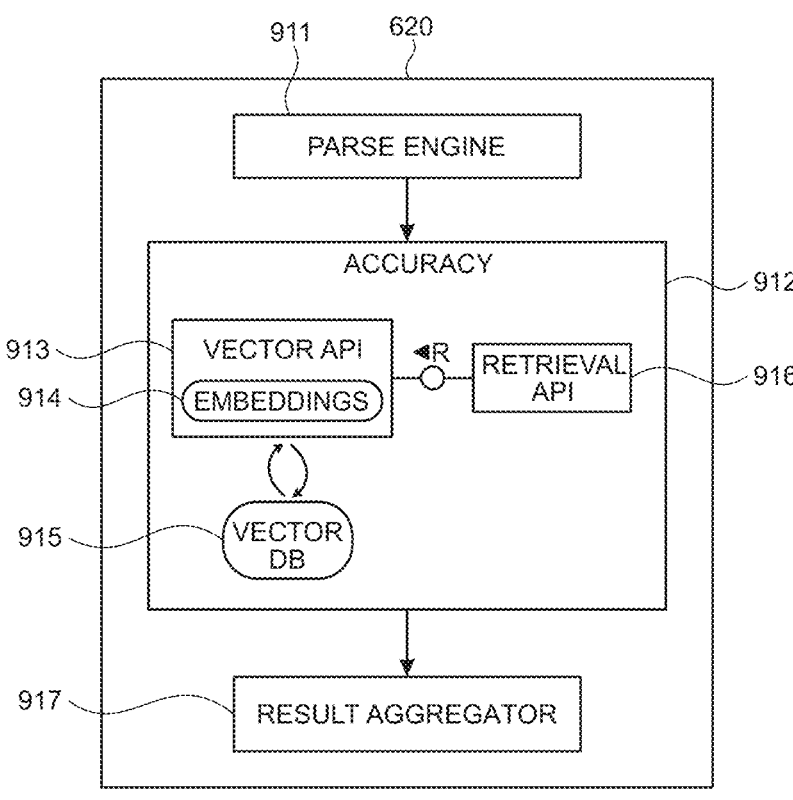
FIG. 9 is a block diagram of a data accuracy component according to some embodiments.

FIG. 9 is a block diagram of data accuracy validation component 620 according to some embodiments.

Component 620 includes parse engine 911, accuracy application 912 and result aggregator 917. Parse engine 911 identifies the relevant datasets and attributes to be passed to the accuracy application 912. Retrieval API 916 of application 912 retrieves the datasets and attributes and uses vector API 913 to convert the data into vector embeddings 914. The Euclidean distances (or $l2$ distance, etc.) between embeddings 914 and vector embeddings of pre-populated vector database 915 are calculated to determine the accuracy of the data. Results are passed to result aggregator 917, which parses and aggregates the results into log entries as described above.

Figure 10:
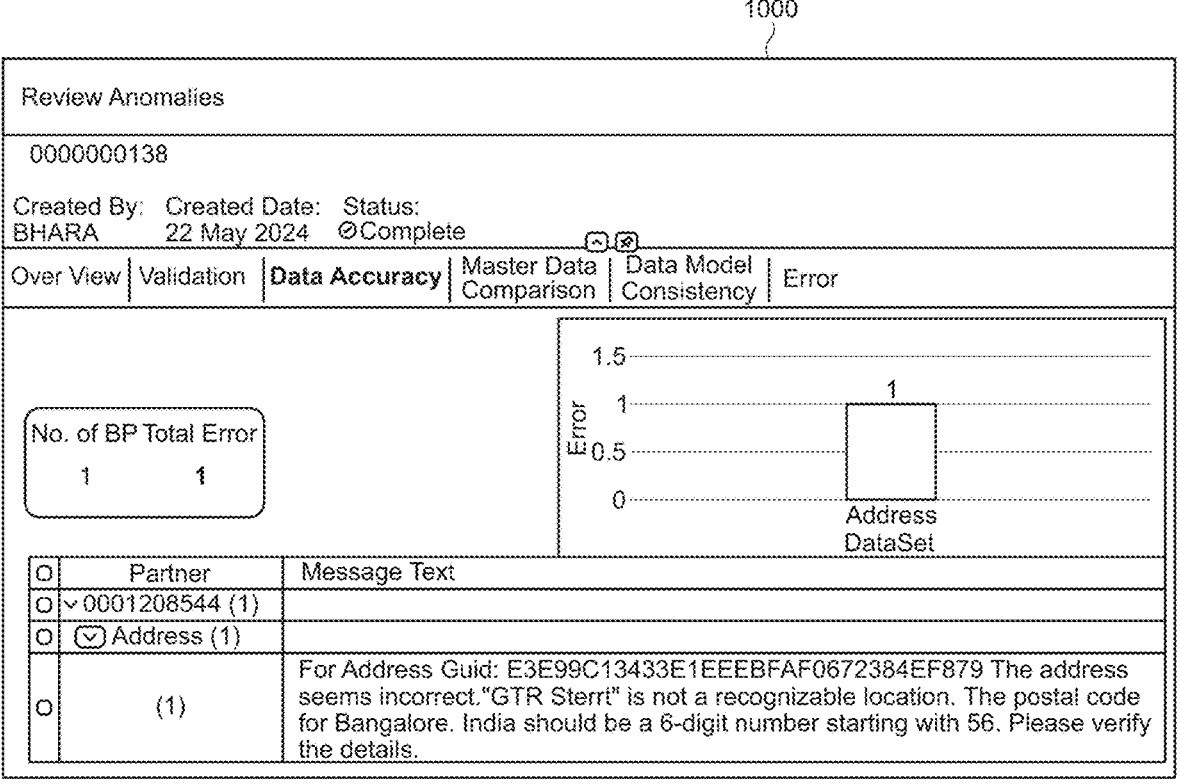
FIG. 10 is a user interface for presenting data accuracy anomalies according to some embodiments.

FIG. 10 shows user interface 1000 for presenting anomalies detected by a data accuracy validation component according to some embodiments. Interface 1000 illustrates one anomaly detected within a particular dataset of a particular Partner entity, along with message text describing the detected anomaly.

Figure 11:
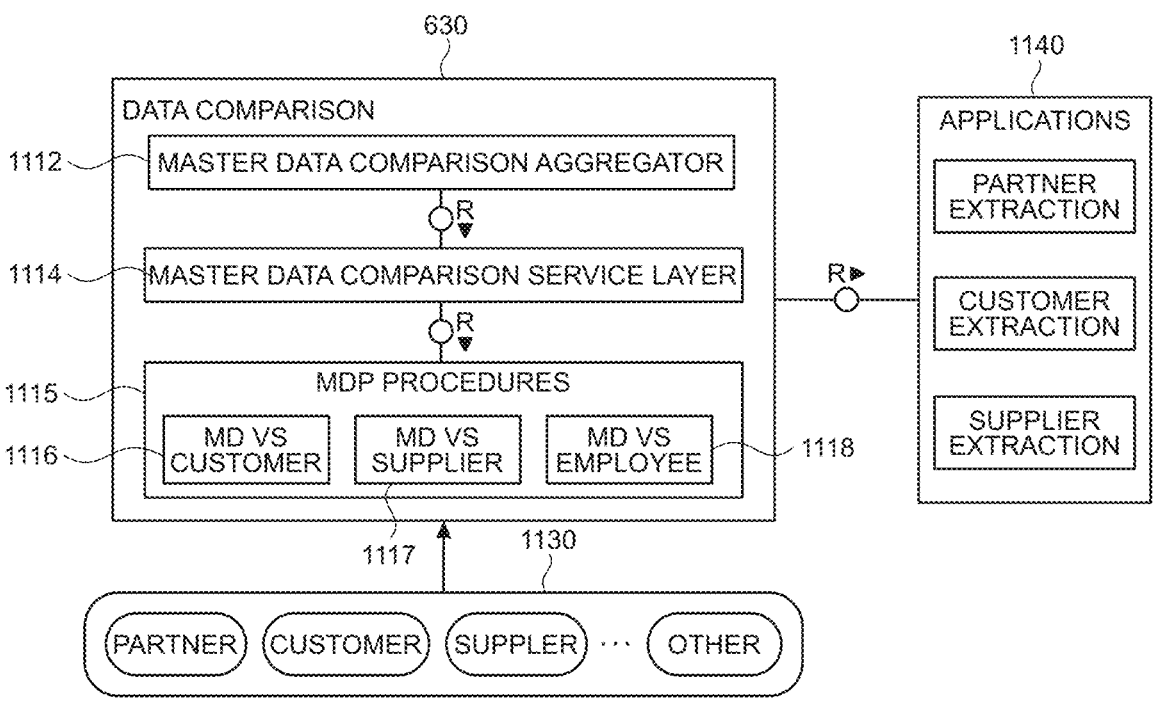
FIG. 11 is a block diagram of a data comparison component according to some embodiments.

FIG. 11 is a block diagram of data comparison module 630 according to some embodiments. Module 630 may compare Partner master data with stored Customer, Vendor, User and Employee entity master data. Master data comparison aggregator 1112 is the entry point for data comparison, triggers the services for comparison, and aggregates the master data comparison result. Master data comparison service layer 1114 identifies relevant check procedures for master data comparison, determines pertinent datasets for comparison, triggers the execution of Managed Database Procedures (MDP) 1115, and communicates with other applications 1140 to retrieve master data for comparison from external sources.

Each of procedures 1116, 1117 and 1118 executes a comparison of attributes of Partners which are shared with other master data sets. In this regard, data models 1130 include a partner data model for storing information about individuals or organizations such as names, addresses, contact details, and other relevant information. Customer and supplier data models define data related to customers and suppliers as customer/supplier numbers, payment terms, credit limits, purchasing data, and other details.

Master data comparison may include mapping corresponding attributes/fields between the partner and customer/supplier data models by identifying which fields in each model represent the same data element. Once the fields are mapped, relevant data is extracted from both the partner and customer/supplier data models. The extracted data may be cleansed by removing duplicates, correcting formatting issues, and ensuring consistency in data values. The sets of cleansed data are then compared by to identify inconsistencies or discrepancies between the sets of data. According to some embodiments, any identified inconsistencies or discrepancies are analyzed to identify their root causes. Based on the analysis, appropriate actions may be taken to resolve the inconsistencies.

Figure 12:
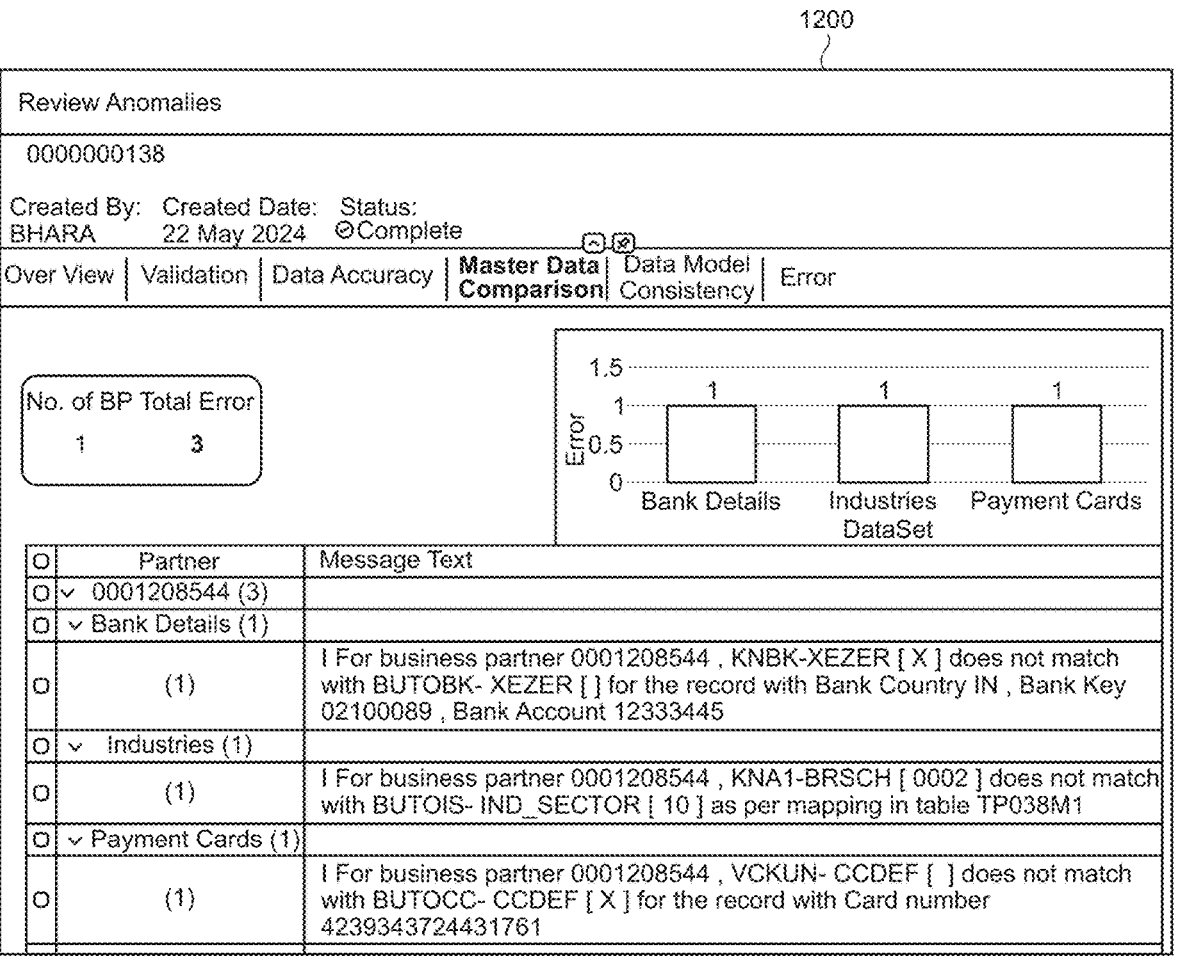
FIG. 12 is a user interface for presenting data comparison anomalies according to some embodiments.

FIG. 12 shows user interface 1200 for presenting anomalies detected by a master data comparison component according to some embodiments. Interface 1200 illustrates three detected anomalies, one for each of three datasets.

Figure 13:
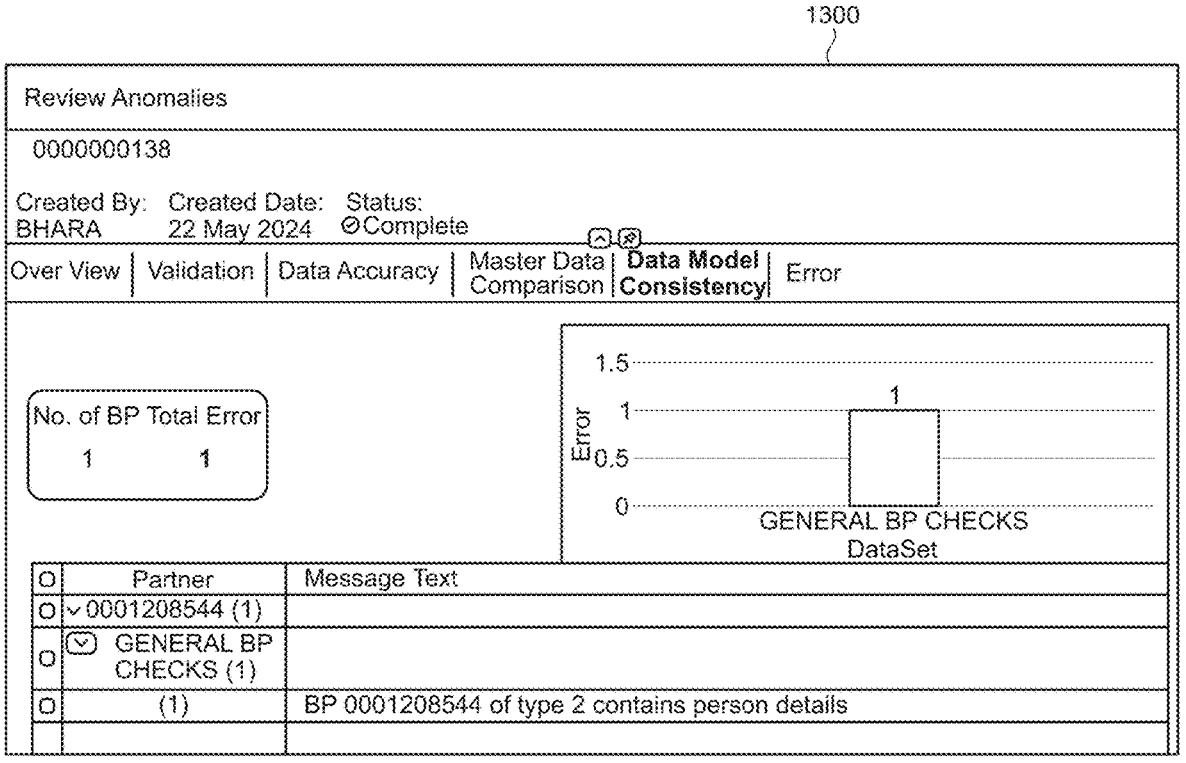
FIG. 13 is a user interface for presenting model consistency anomalies according to some embodiments.

FIG. 13 shows user interface 1300 for presenting anomalies detected by model consistency evaluation component 640 according to some embodiments. One anomaly has been detected in a dataset.

Figure 14:
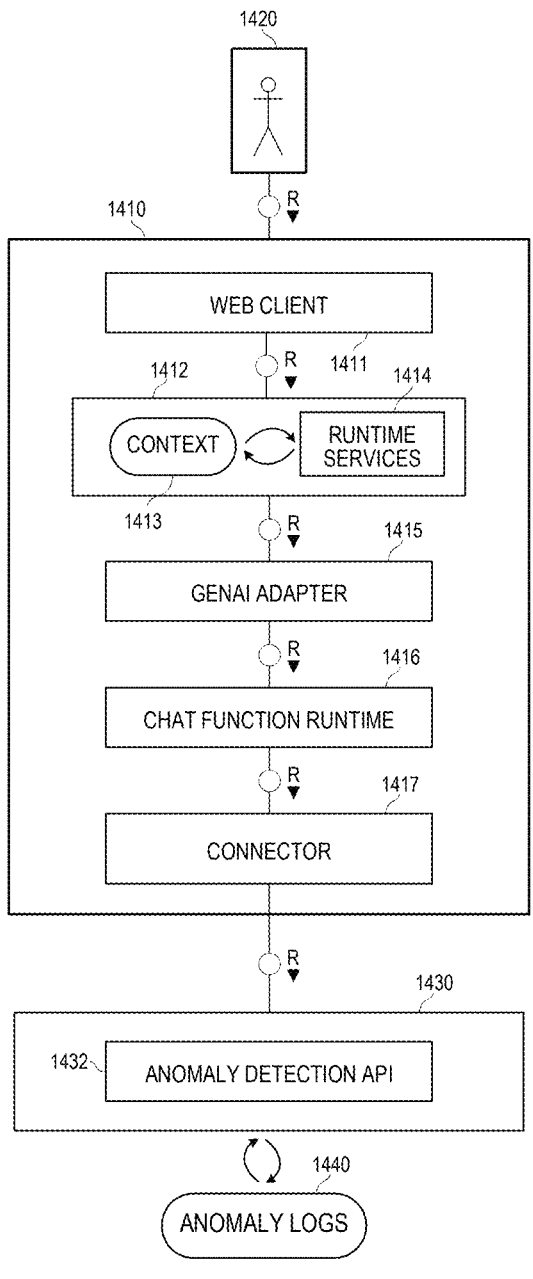
FIG. 14 is a block diagram of a system to provide proactive anomaly detection via a generative AI chatbot according to some embodiments.

FIG. 14 is a block diagram of a system to provide proactive anomaly detection via a generative AI chatbot according to some embodiments. Runtime component 1410 provides web client 1411 which may be accessed by a Web browser operated by user 1420. Chat component 1412 stores conversation context 1413 and executes runtime services 1414 to provide chatbot functionality.

If user 1420 inputs a request to execute an anomaly check, the request is passed through adapter 1415, chat function runtime 1416 and connector 1417, which calls anomaly detection API 1432 of anomaly identifier 1430. Anomaly identifier 1430 may execute the requested anomaly check and generate a corresponding log entry for storage in logs 1440 and/or return to chat component 1412.

FIG. 15 shows user interface 1500 of a generative AI chatbot according to some embodiments. User input 1510 may be interpreted as a request for an anomaly check on a master data entity instance (i.e., instance 'S100'). In response, an anomaly check is requested as described above and response 1520 is presented. Response 1520 includes a link to results of the anomaly check. The link may provide access to an interface of anomaly check application 150 which displays the results.

Figure 16:
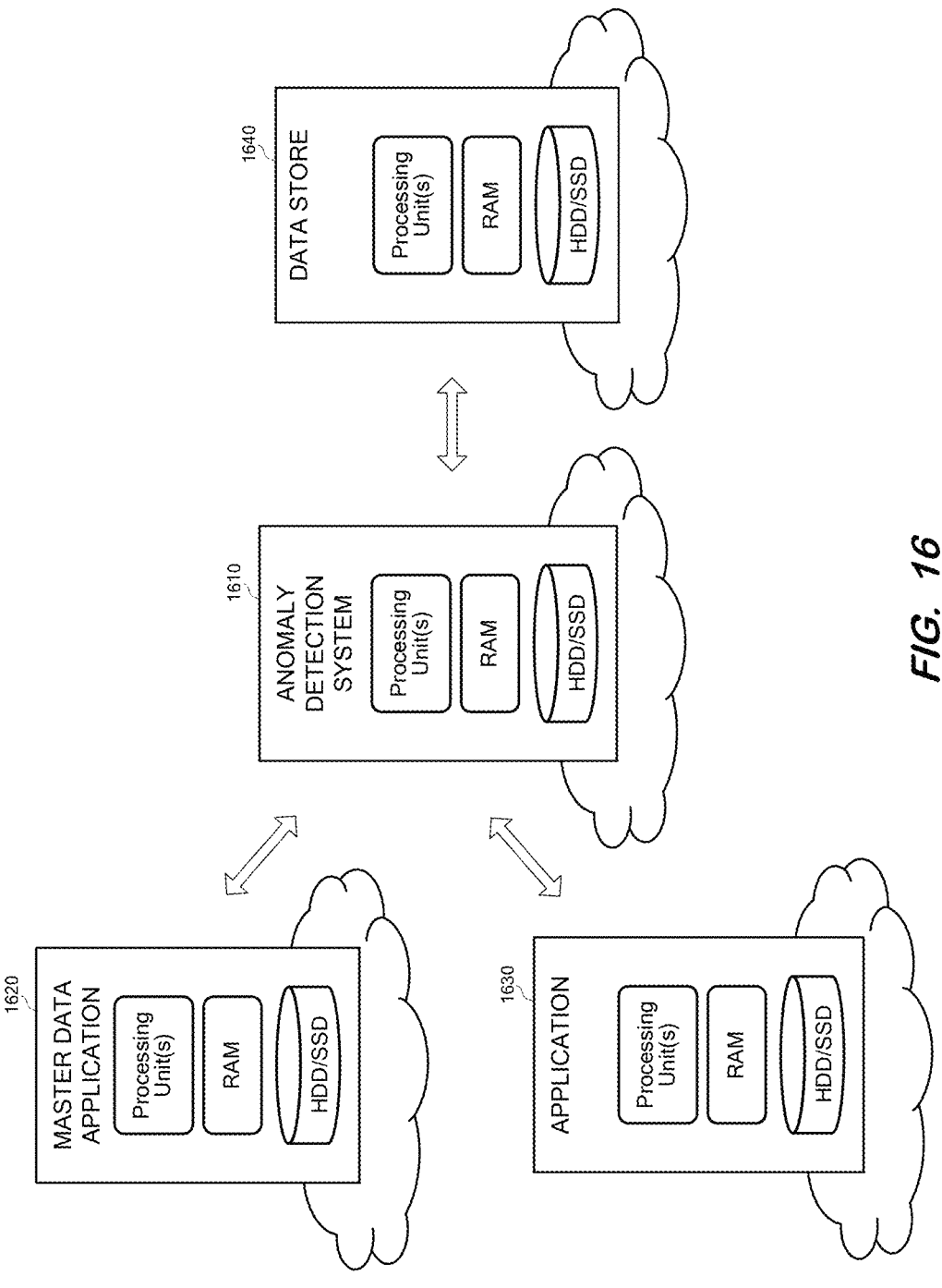
FIG. 16 is a block diagram of cloud-based servers of a system to train and use a classification model based on anomaly detection according to some embodiments.

FIG. 16 illustrates a cloud-based deployment according to some embodiments. Each illustrated component may comprise cloud-based compute resources residing in one or more public clouds providing self-service and immediate provisioning, autoscaling, security, compliance and identity management features. Each component may comprise servers or virtual machines of a Kubernetes cluster.

Anomaly detection system 1610 receives requests from master data application 1620 and application 1630 to perform anomaly checks on entity instances. Data store 1640 may store data associated with the entity instances, and which is therefore accessed by anomaly detection system 1610 to perform the anomaly checks.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid-state random-access memory or read-only memory storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a first memory storing first program code;
a first at least one processing unit to execute the first code to cause the system to:
detect creation of data associated with an instance of a master data entity;
in response to the detected creation, request execution of one or more anomaly checks of stored data associated with the instance of the master data entity, the request of execution of the one or more anomaly checks comprising a request to stop the anomaly checks after detection of one anomaly; and
store, in response to the execution of the one or more anomaly checks resulting in a detection of an anomaly, a log entry of the detected anomaly in an anomaly log;
a second memory storing second program code; and
a second at least one processing unit to execute the second program code to cause the system to:

detect, in response to the storing of the log entry in the anomaly log, the log entry associated with the one or more anomaly checks;
identify, based on the log entry, the instance of the master data entity;
determine to perform a second anomaly check based on the identified instance of the master data entity;
in response to the determination to perform the second anomaly check, request execution of a second anomaly check of stored data associated with the instance of the entity, the request for execution of the second anomaly check including a specification of the master data entity instance, an initiation of a full anomaly check of a second one or more anomaly checks to perform on data associated with the master data entity instance that continue until all of the specified second one or more anomaly checks are performed, the initiation of the full anomaly check of the second one or more anomaly checks being implemented via an application programming interface (API) of a processor-enabled anomaly identifier;
receive results of the full anomaly check from the anomaly identifier;
create a visualization including representations of the results the full anomaly check; and
transmit the visualization to a user via a user interface.

2. The system of claim 1, wherein the full anomaly check comprises a request to check for all anomalies.

3. The system of claim 1, further comprising:
a third memory storing third program code; and
a third at least one processing unit to execute the third program code to cause the system to:
receive the request for execution of the anomaly check of stored data associated with the instance of the entity;
perform the anomaly check to identify an anomaly;
in response to identification of the anomaly, stop the anomaly check;
generate the log entry based on the anomaly; and
store the log entry.

4. The system of claim 3, the third at least one processing unit to execute the third program code to cause the system to:
receive the request for execution of the second anomaly check; and
in response to the request for execution of the second anomaly check, execute the second anomaly check.

5. The system of claim 1, wherein the determination to perform a second anomaly check based on the instance of the entity comprises:
determination that the instance of the entity is a critical instance.

6. The system of claim 5, the first at least one processing unit to execute the first code to cause the system to:
detect creation of second data associated with a second instance of the entity; and
in response to the detected creation of the second data, request execution of a third anomaly check of stored second data associated with the second instance of the entity,
the second at least one processing unit to execute the second program code to cause the system to:
detect a second log entry associated with the third anomaly check;
identify, based on the second log entry, the second instance of the second entity;

determine that the second instance of the second entity is not a critical instance; and in response to the determination that the second instance of the second entity is not a critical instance, determine to not perform an anomaly check of the stored second data associated with the second instance of the entity.

7. A method comprising:

creating data associated with an instance of a master data entity;

in response to creating the data, requesting execution of one or more partial anomaly checks of stored data associated with the instance of the master data entity, the request of execution of the one or more partial anomaly checks comprising a request to stop the partial anomaly checks after detection of one anomaly;

store, in response to the execution of the one or more anomaly checks resulting in a detection of an anomaly, a log entry of the detected anomaly in an anomaly log;

detecting, in response to the storing of the log entry in the anomaly log, the log entry associated with the one or more partial anomaly checks;

identifying, based on the log entry, the instance of the master data entity;

determining that the identified instance of the master data entity is a critical instance;

in response to determining that the instance of the entity is a critical instance, determining to perform a full anomaly check based on the instance of the entity;

in response to determining to perform the full anomaly check, requesting execution of a full anomaly check of stored data associated with the instance of the entity, the request for execution of the full anomaly check including a specification of the master data entity instance, an initiation of a full anomaly check of a second one or more anomaly checks to perform on data associated with the master data entity instance that continue until all of the specified second one or more anomaly checks are performed, the initiation of the full anomaly check of the second one or more anomaly checks being implemented via an application programming interface (API) of a processor-enabled anomaly identifier;

receiving results of the full anomaly check from the anomaly identifier;

creating a visualization including representations of the results the full anomaly check; and transmitting the visualization to a user via a user interface.

8. The method of claim 7, wherein the request of execution of the full anomaly check comprises a request to check for all anomalies of the stored data associated with the instance of the entity.

9. The method of claim 7, further comprising:

receiving the request for execution of the partial anomaly check of stored data associated with the instance of the entity;

performing the partial anomaly check to identify an anomaly;

in response to identification of the anomaly, stopping the partial anomaly check;

generating the log entry based on the anomaly; and storing the log entry.

10. The method of claim 9, further comprising:

receiving the request for execution of the full anomaly check; and in response to the request for execution of the full anomaly check, executing the full anomaly check.

11. The method of claim 7, further comprising:

detecting creation of second data associated with a second instance of the entity; and in response to detecting creation of the second data, requesting execution of a second partial anomaly check of stored second data associated with the second instance of the entity;

detecting a second log entry associated with the second partial anomaly check;

identifying, based on the second log entry, the second instance of the second entity;

determining that the second instance of the second entity is not a critical instance; and in response to determining that the second instance of the second entity is not a critical instance, determining to not perform a second full anomaly check of the stored second data associated with the second instance of the entity.

12. One or more computer-readable media storing program code, the program code executable by a computing system to cause the computing system to:

create data associated with an instance of a master data entity;

in response to creation of the data, request execution of one or more partial anomaly checks of stored data associated with the instance of the master data entity, the request of execution of the one or more anomaly checks comprising a request to stop the anomaly checks after detection of one anomaly;

store, in response to the execution of the one or more anomaly checks resulting in a detection of an anomaly, a log entry of the detected anomaly in an anomaly log;

detect, in response to the storing of the log entry in the anomaly log, the log entry associated with the one or more partial anomaly checks;

identify, based on the log entry, the instance of the master data entity;

determine that the identified instance of the master data entity is a critical instance;

in response to the determination that the instance of the entity is a critical instance, determine to perform a full anomaly check based on the instance of the entity;

in response to the determination to perform the full anomaly check, request execution of a full anomaly check of stored data associated with the instance of the entity, the request for execution of the full anomaly check including a specification of the master data entity instance, an initiation of a full anomaly check of a second one or more anomaly checks to perform on data associated with the master data entity instance that continue until all of the specified second one or more anomaly checks are performed, the initiation of the full anomaly check of the second one or more anomaly checks being implemented via an application programming interface (API) of a processor-enabled anomaly identifier;

receiving results of the full anomaly check from the anomaly identifier;

creating a visualization including representations of the results the full anomaly check; and transmitting the visualization to a user via a user interface.

13. The one or more computer-readable media of claim 12, wherein the request of execution of the full anomaly check comprises a request to check for all anomalies of the stored data associated with the instance of the entity.

14. The one or more computer-readable media of claim 12, the program code executable by a computing system to cause the computing system to:

receive the request for execution of the partial anomaly check of stored data associated with the instance of the entity;

perform the partial anomaly check to identify an anomaly;

in response to identification of the anomaly, stop the partial anomaly check;

generate the log entry based on the anomaly; and store the log entry.

15. The one or more computer-readable media of claim 14, the program code executable by a computing system to cause the computing system to:

receive the request for execution of the full anomaly check; and in response to the request for execution of the full anomaly check, execute the full anomaly check.

16. The one or more computer-readable media of claim 12, the program code executable by a computing system to cause the computing system to:

detect creation of second data associated with a second instance of the entity; and in response to detection of the creation of the second data, request execution of a second partial anomaly check of stored second data associated with the second instance of the entity;

detect a second log entry associated with the second partial anomaly check;

identify, based on the second log entry, the second instance of the second entity;

determine that the second instance of the second entity is not a critical instance; and in response to the determination that the second instance of the second entity is not a critical instance, determine to not perform a second full anomaly check of the stored second data associated with the second instance of the entity.

17. The one or more computer-readable media of claim 16, the program code executable by a computing system to cause the computing system to:

receive the request for execution of the partial anomaly check of stored data associated with the instance of the entity;

perform the partial anomaly check to identify an anomaly;

in response to identification of the anomaly, stop the partial anomaly check;

generate the log entry based on the anomaly; and store the log entry.

* * * * *